United States Patent [19]

Hiigli

[11] Patent Number: 5,067,848

[45] Date of Patent: Nov. 26, 1991

[54] CONNECTOR AND METHOD FOR USE THEREOF

[76] Inventor: John A. Hiigli, 164 W. 83rd St., New York, N.Y. 10024

[21] Appl. No.: 498,202

[22] Filed: Mar. 23, 1990

[51] Int. Cl.$^5$ .............................................. B25G 3/00
[52] U.S. Cl. ............................... 403/406.1; 403/408.1;
24/578; 446/113
[58] Field of Search ....................... 446/113, 120, 122;
24/453, 297, 578; 403/406.1, 408.1

[56] References Cited

U.S. PATENT DOCUMENTS

| | | | |
|---|---|---|---|
| 3,066,501 | 12/1962 | Charles et al. | 24/578 X |
| 3,367,340 | 2/1968 | David et al. | 24/453 X |
| 3,514,815 | 6/1970 | Evans | 24/578 X |
| 3,597,874 | 8/1971 | Ogsbury et al. | 446/113 |
| 3,990,131 | 11/1976 | Okamura | 24/578 X |
| 4,037,878 | 7/1977 | Connelly | 446/113 |

FOREIGN PATENT DOCUMENTS

| | | | |
|---|---|---|---|
| 100283 | 2/1937 | Australia | 446/122 |
| 545023 | 8/1957 | Canada | 446/113 |
| 546770 | 8/1956 | Italy | 24/453 |
| 583453 | 10/1958 | Italy | 24/578 |

Primary Examiner—Andrew V. Kundrat
Attorney, Agent, or Firm—George W. MacDonald, Jr.

[57] ABSTRACT

Connectors for attaching thin, lightweight, walls of the type appearing in children's toys made up of geometrical units, and methods for using the same. In one embodiment, the connector consists of a cavity with a basal opening built into each of the walls to be connected and a separate insertable member, each end of which snaps into a corresponding cavity on each wall. The insertable member consists of a central element attached at each of its polar ends to a smaller distal element. The basal opening of the cavity may consist of an opening enclosed by the wall or may be a hole through the wall. The smaller distal element of the insertable member is of variable shape and diameter depending upon the specific attachment requirement. Other embodiments include connectors without a separate insertable member, wherein the cavity and the insertable member are part of the wall, and, in one embodiment, may be inverted, and, in another embodiment, a fixed protuberaance on one wall may be inserted into an opening on another wall.

12 Claims, 2 Drawing Sheets

CONNECTOR AND METHOD FOR USE THEREOF

BACKGROUND OF THE INVENTION

1. Field of the Invention

The present invention relates to connector devices for fastening together relatively thin-walled, light-weight, planes or structures. An important application for such devices is light-weight models possessing plane surfaces, whereby one plane is to be fastened to another. An example of such a model is an educational toy consisting of geometric shapes of various sizes and conformations. Such a toy will be reconfigured and/or expanded by the user by fastening together different geometrical elements, which are constructed of planes. For reasons of manufacturing economy and ease of manipulation by the user (often a child), such models or toys are constructed of thin-walled, light-weight, relatively stiff materials such as plastic or cardboard.

Fastening together the elements of such a toy or model poses unusual problems because the materials to be fastened are light-weight and thin-walled, and therefore possess limited structural strength. The fastening means also must result in a tight connection, whereby the elements, once joined, will not slip or move relative to each other. Further, the means for fastening such a toy or model must permit easy assembly and disassembly of such elements. Lastly, such fastening means cannot be expensive to manufacture.

2. Description of the Related Art

Traditional fastening means for such toys or models have been magnets or Velcro ®. Such fastening means are described in Roane U.S. Pat. Nos. 4,258,479, 4,334,870, and 4,334,871 (magnets) and Billis U.S. Pat. No. 3,117,384 (Velcro ®). Also very generally related to the present invention are the "pop beads" popular some years ago. As will better be described below, the only common element between such "pop beads" and the present invention is the concept of inserting one element into a companion receptacle in order to join the elements.

SUMMARY OF THE INVENTION

The present invention relates to fastening or connector devices for light-weight, thin-walled, models or toys. The connectors of the present invention have substantially advantages over prior art connecting means such as magnet or Velcro ®. In the first place, unlike magnets or Velcro ® connecting devices, they do not require a particular orientation in order to achieve a fastening effect. Magnets, of course, have polarity, and it is necessary for the user of a toy with magnets to be sure that the surfaces being attached are properly oriented in order to achieve a magnetic effect. Similarly, Velcro ® surfaces may be attached only if the correct surfaces are aligned. In the context of an educational toy, wherein the user often will be a young child, the need to orient the attachment means may interfere with the principal point of the learning process, namely, the creation of diverse and/or larger geometrical forms. Another significant factor, because of the educational context, is that the mystery attaching to the operation of a magnet may distract the attention of the user—often a child—from the block building and arrangement process itself.

Further, certain conventional attachment means, such as magnets, are relatively heavy. Some of the models with which such magnets are to be used will be quite large and the combined weight of the magnets may cause the structure to become unstable and even collapse. This especially will be so because in order to permit maximum flexibility in orienting the elements of the structure, it may be necessary to provide both positive and negative polarity at each location of a magnet, thereby requiring twice as many magnets. A further disadvantage of magnets, particularly when used by children to attach educational blocks, is that they must be carefully and correctly aligned; if not, they will lose attachment capability. This problem can be overcome by using larger magnets but these have the disadvantage of being heavy and, particularly for children, difficult to separate. Other conventional attachment means, such as Velcro ® attachment surfaces, are not heavy but may require a relatively large overall attachment area in order to be effective. Velcro ® wears out relatively quickly, an especially important factor in the instant context because children will be principal users of the material. Both magnets and Velcro ® attachment means are relatively expensive to manufacture. Prior attachment means suitable for the present purpose, namely, attaching the elements of educational toys, must be separately manufactured and attached as a unit to the surfaces of the toys, a relatively expensive process which adds to the expense of manufacture.

Lastly, surfaces attached by conventional attachment means, such as magnets and Velcro ®, are relatively difficult to separate, a task which may be unduly difficult for the coordination skills of young children. Such conventional attachment means also lose their attachment capability with age and use.

The present invention avoids the problems and limitations attached to conventional attachment means by providing simple, light-weight, connectors or fasteners which are constructed from inexpensive materials such as plastic, and are easily inserted or removed by young children, without the need for orientation of the connecting elements. The connectors of the present invention are, at least in part, integral with the surfaces to be joined, and may be made of the same material. The manufacturing process required to make them is in most cases simple and inexpensive, for example, molding or stamping. Such connectors are especially suitable for use with light-weight, thin-walled, materials such as those from which geometrical educational toys are constructed. They do not interfere with the basic aim of the learning process, namely, to associate, orient, and create structures from smaller elements. The connectors contemplated by the present invention are best described in respect to the drawings and to the preferred embodiments which are set out below.

DESCRIPTION OF THE PREFERRED EMBODIMENTS

Following is a description of the preferred embodiments of the present invention, with reference to the FIGS.

Figure 1:
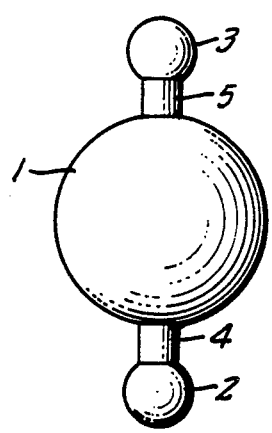
FIG. 1 is a side view of a connector, representing one embodiment of the present invention.
Figure 2:
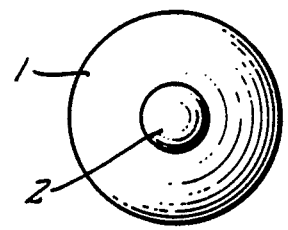
FIG. 2 is a top plan view of the embodiment of FIG. 1.

FIG. 1 (FIG. 2 is a top plan view) illustrates the form of a typical, and preferred, embodiment of one of the two parts, the insertable element, of one of the connectors of the present invention.

Figure 3:
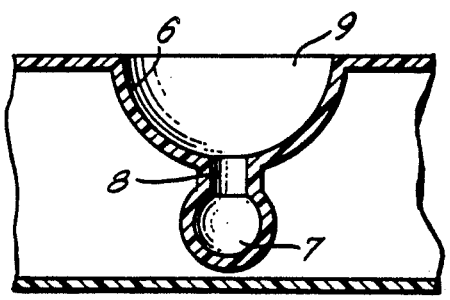
FIG. 3 is a side sectional view of one embodiment of the receptacle element of the present invention.
Figure 4:
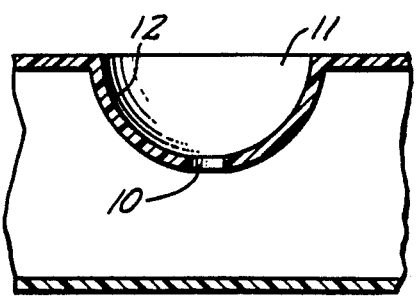
FIG. 4 is a side sectional view of another embodiment of the receptacle element of the present invention.

In a typical embodiment, the connector of the present invention consists of two elements, one being an insertable element of the type shown in FIG. 1, and the other element being the receptacle into which the insertable element is inserted (e.g., as shown in FIGS. 3 and 4). In a typical two-part embodiment of the present connector, the two parts shown as joined in FIG. 5, the insertable element of the present connector is a separate unattached, piece. The receptacle element of the connector, however, is typically part of the surface or plane which is to be attached to another surface. The user of such an embodiment will take a surface, which will typically be part of a geometric structure, and bring it close to another surface (of another structure). Each of such surfaces will have already formed in it a connector receptacle or receptacles, as shown in, e.g., FIG. 4. An insertable connector element such as is shown in FIG. 1 will be inserted into the connector receptacle(s) built into each of the surfaces to be joined. The sequence of steps by which this may be performed is variable, but a convenient procedure is to insert the insertable connector element into the connector receptacle of one of the surfaces to be joined (as in FIG. 5) and then to insert the insertable element into the connector receptacle of the other surface. (as shown in FIG. 5A).

It will be seen that the insertable connector element of FIGS. 1 and 2 consists of 3 elements, a larger central sphere, 1, (for purposes of convenience, all numbers referred to herein which designate elements of the FIGS. retain the same meaning throughout all the FIGS.) which is connected at the opposite poles to smaller spheres, 2 and 3. Each of the smaller spheres 2 and 3 is connected to the large central sphere 1 by a neck, 4 and 5, respectively. The large central sphere, 1, is intended to be grasped by the user of the connector and the distal spheres, 2 and 3, are intended to be inserted into a coordinate receptacle element, such as is shown in FIG. 4, located on the surfaces to be attached. It will be understood that while the central and distal elements of the insertable connector element typically will be spheres, other geometrical forms (some of which are described hereinafter) may also be suitable, particularly for special application.

FIG. 3 illustrates one embodiment of a connector receptacle of the type into which the insertable connector element shown in FIG. 1 may be inserted. The walls of such a connector receptacle, which is typically built into and is part of each of the surfaces to be joined, are as thin as possible, consistent with minimal strength, stiffness, and integrity, in order to minimize weight and the cost of the material from which they are constructed.

In the embodiment illustrated in FIG. 3, the receptacle is formed with a cavity, part (7) of which receives and encloses one of the small distal connecting spheres of the insertable connector elements (shown in FIG. 1 as 2 or 3), another part (8) of which receives and encloses the neck (shown in FIG. 1 as 4 and 5) connecting the small distal sphere to the large central sphere (shown in FIG. 1 as 1), and the remainder (9) of which receives the large central sphere (shown in FIG. 1 as 1) of the insertable connector element. The connector receptacle of FIG. 3 performs one of the objectives and illustrates certain of the advantages of the connectors of the present invention; namely, it is light-weight, the insertable element may be easily inserted, and, once inserted, the connector elements are firmly seated and will not slip. In part, such ease of use and freedom from slippage are accomplished because the dimensions of the connector receptacle are carefully selected in order to be only slightly greater than those of the insertable connector element. In the embodiment shown in FIG. 3, this is somewhat less important in achieving minimal slippage than in certain other embodiments, for example, that shown in FIG. 6, because in the embodiment shown in FIG. 6 there is no portion of the cavity of the connector receptacle especially designed to accommodate the small distal sphere or the neck of the insertable connector element. The connector receptacle of FIG. 3 relies as much upon shape as well as upon close control of dimensions, in order to hold the insertable connector element firmly in place.

FIG. 4 illustrates a varient of the embodiment of the connector receptacle shown in FIG. 3. The connector receptacle 11 of FIG. 4 is identical to that illustrated in FIG. 3, except that it lacks a separate cavity (7, in FIG. 3) for the small distal sphere of the insertable connector element and does not have a cavity (8, in FIG. 3) for the neck. The insertable element (for example, that shown in FIG. 1) is inserted through an opening 10 in the receptacle wall 12 of FIG. 4. Such a configuration is a preferred embodiment because it is easier and cheaper to manufacture than the embodiment shown in FIG. 3 and insertion of the insertable connector element is easier. However, in order to be fully effective, the wall 12 of the receptacle 11 shown in FIG. 4 must be dimensioned so that the insertable element of the connector is firmly seated and does not move. In substantial part, this will be accomplished by dimensioning receptacle 11 of FIG. 4 to very closely approximate the dimensions of the central sphere (e.g. 1 of FIG. 1) of the insertable connector element and by determining the thickness of the wall 12 of FIG. 4 so that the wall 12 will be only marginally thicker than the length of the neck (e.g., 4 in FIG. 1) of the insertable element. Although achieving the relative non-slippage of the joined surfaces will be easier with the receptacle of FIG. 3, the same end may be accomplished by the receptacle of FIG. 4. It will be appreciated that the wall thickness required to achieve the desired seating effect will vary with the dimensions of the receptacle and the insertable element. A further important factor is the nature of the material from which the connector receptacle is formed. In the embodiment shown in FIG. 4, such material, which will be the same as that from which the surfaces to be joined are formed, will have to be relatively tougher and stiffer than that from which the embodiment of FIG. 3 is formed, since the embodiment of the connector receptacle shown in FIG. 4 will be subject to additional stress, both in respect to inserting the insertable connector element and while the surfaces are attached.

Figure 5:
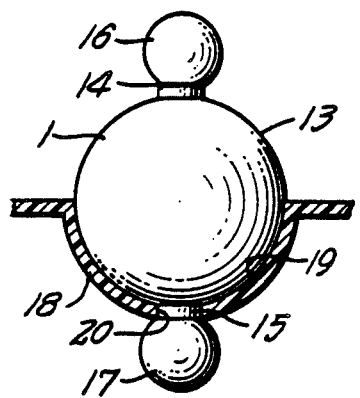
FIG. 5 is a side sectional view of an embodiment of the present invention illustrated in FIG. 4, showing the insertable element of a connector of the present invention which has been inserted into the connector receptacle.
Figure 5A:
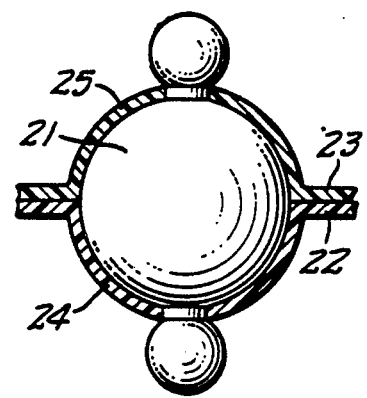
FIG. 5A is a side sectional view similar to FIG. 5 showing the insertable element of a connector of the present invention joining two surfaces by being inserted into the connector receptacles associated with each of the two surfaces.

FIG. 5 illustrates a preferred embodiment of the insertable connector element, illustrated in basic form in FIG. 1, inserted into a receptacle element 19 of the type shown in FIG. 4. In FIG. 5, the elements of the insertable connector element 13 are the same as those in FIG. 1, but the proportions are different. The insertable member 13 of FIG. 5 consists of a larger central sphere 1 to which smaller distal spheres 16 and 17 are attached by necks 14 and 15. In the insertable connector element 13 of FIG. 5 the smaller distal spheres 16 and 17 are relatively larger in proportion to central sphere 1 than are distal spheres 2 and 3 to central sphere 1 in FIG. 1. Further, in FIG. 5, the necks 14 and 15 are proportionately shorter and wider than are their counterparts 4 and 5 in FIG. 1. In FIG. 5, neck 15 is only very slightly longer than the thickness of wall 18 of the connector receptacle 19. As a result, insertion of distal sphere 17, which is only moderately greater in diameter than the diameter of the opening 20 in the connector receptacle wall 18, is relatively easy. Once inserted, because of the length of the neck 15 is almost the same as that of the thickness of the receptacle wall 18, the central sphere 1 of the insertable connector element 13 is tightly seated against the receptacle wall 18 and the distal sphere 17 is unable to move relative to the connector receptacle 19. The result is that there will be no slippage of each of the two elements of the connector relative to the other.

In FIG. 5, wall 18 of the connector receptacle 19 is also an integral part of one of the surfaces being joined by the insertable connector element 21. FIG. 5A shows two such connector receptacle/surfaces 22 and 23 joined together by an insertable element 21. In FIG. 5A, it will be seen that surfaces 22 and 23 each contain a connector receptacle, designated 24 and 25, respectively. Therefore, in use, a connector of the type embodied in FIG. 5 may be visualized as the two surfaces to be joined, each containing a connector receptacle of the type illustrated as 11 in FIG. 4, and a single insertable connector element which has been inserted into the connector receptacle located on each of the surfaces to be joined.

It will be understood that a given surface to be joined to another surface may contain as many connector receptacles as may be deemed appropriate to join the surface firmly to another surface. The number of such receptacles will depend upon such factors as the weight, area, shape, and thickness of the surfaces to be joined. If the surfaces to be joined are part of a unitary geometrical toy, such surfaces will be part of a configuration of surfaces that has substantial strength and rigidity by virtue of that configuration. As a result, the surfaces used for such a purpose, unless very large, may not require more than one receptacle/insertable element per surface. Such a structure is easier to use and less expensive to manufacture than a structure made up of surfaces containing more than 1 connector receptacle.

Figure 6:
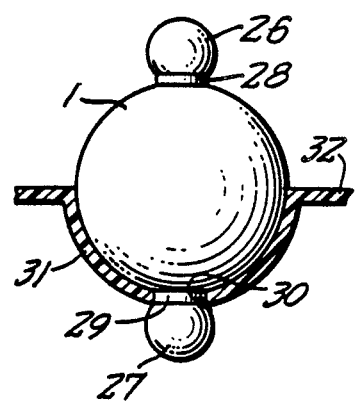
FIG. 6 is a side sectional view of a further variation of the embodiment of the present invention illustrated in FIG. 4, showing the insertable element of a connector of the present invention inserted into the connector receptacle.

FIG. 6 illustrates a variation of the connector shown in FIG. 5. In FIG. 6, an insertable element, having a central sphere and distal spheres 26 and 27, has been inserted into a connector receptacle 31. The distal spheres 26 and 27 of the insertable connector element of FIG. 6 are proportionately not much greater in diameter than the diameter of the necks 28 and 29. The ratio between the diameter of distal spheres 26 and 27 of the insertable element of FIG. 6 and the respective necks is more nearly 1:1 than is the same ratio in FIG. 5. As a result, distal spheres 26 and 27 are relatively easy to insert through the opening 30 in the connector receptacle 31 (and of the wall 32 of the surface to be attached). Slippage is eliminated because the length of neck 29 is very nearly the same as the thickness of connector receptacle wall 32 and by the relatively greater width of neck 29 and distal sphere 27. As a result, the areas of the contacting surfaces, and the attendant friction and resistance to slippage, are greater, and the very close fit of the neck of the insertable connector element to the receptacle opening minimizes longitudinal movement.

Figure 7:
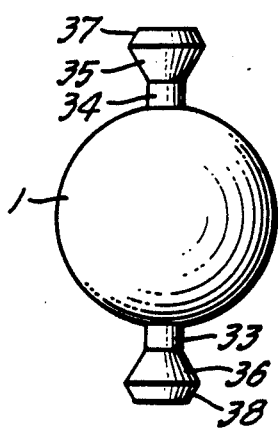
FIG. 7 is a side view of the insertable element of a further embodiment of a connector of the present invention, a variant of the embodiment illustrated in FIG. 1.
Figure 7A:
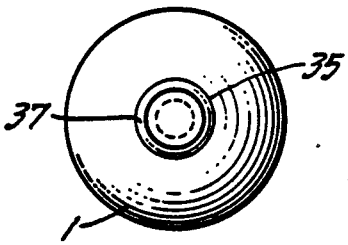
FIG. 7A is a top plan view of the insertable connector element of FIG. 7.

FIG. 7 illustrates an insertable connector element which is a variant of that shown in FIG. 1. In the embodiment of FIG. 7, at the polar ends of the large central sphere 1 are necks 33 and 34, to each of which is attached a modified version (35 and 36, respectively) of the insertable smaller distal spheres 2 and 3 in FIG. 1. The modified distal elements 35 and 36 of FIG. 7 are not spheroidal but are more or less trapezoidal in cross section, and are bevelled at the ends (the bevelled surfaces in FIG. 7 are denominated 37 and 38, and, as shown in FIG. 7A, which is a top plan view, are circular around the ends of distal spheres 35 and 36). Elements 35 and 36 of FIG. 7 will seat more firmly and provide a closer, tighter, connection between the adjoining surfaces to be connected, than, for example, will the undifferentiated distal spheres 2 and 3 of FIG. 1. They also are inserted with more difficulty (more force is required) than a rounded sphere and are less easily removable. Such a connector therefore will be useful where a tighter attachment of surfaces is required, and typically will be used by older children or adolescents who have the combined strength and dexterity to manipulate them.

Figure 8:
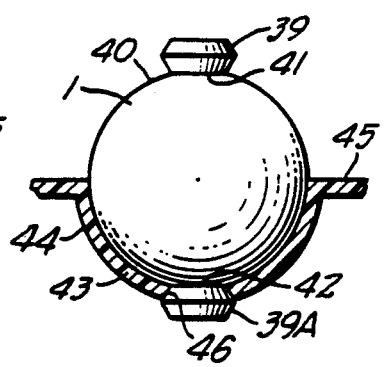
FIG. 8 is a side sectional view of the insertable element of a connector of the present invention inserted into the connector receptacle, the connector being a variant of the embodiment of the present invention illustrated in FIG. 7.

FIG. 8 illustrates a variant of the insertable connector element shown in FIG. 7, shown seated in a receptacle element. In FIG. 8, the distal connecting elements (39 and 39A), in generally the same configuration as shown in FIG. 7, are present, but the distal elements 39 and 39A are attached directly (at areas 41 and 42) to the central sphere 1 without a neck. In the embodiment of FIG. 8, the connecting surfaces 41 and 42 perform the same function as the neck. FIG. 8 shows an insertable connector element 40 having been inserted into a receptacle 43 of the type illustrated in FIG. 4. The connecting areas 41 and 42 are dimensioned so as to be only very slightly thicker than the receptacle wall 44 of the surface 45 to be attached. The insertable connector element 40 of FIG. 8 will be somewhat easier to insert into and remove from the opening 46 in the connector receptacle but will retain much of the resistance to lateral and longitudinal movement that characterizes the distal elements 35 and 36 of FIG. 7.

Figure 9:
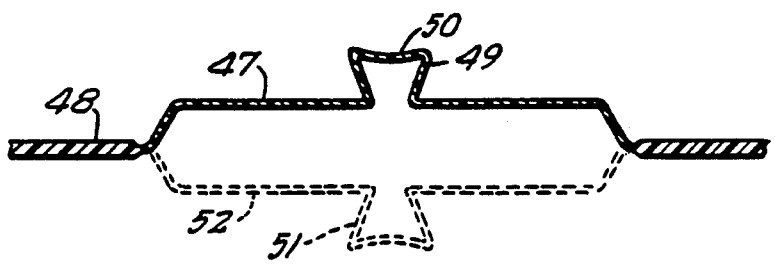
FIG. 9 is a side sectional view of a further embodiment of the present invention.

FIG. 9 illustrates a highly modified variant of the connectors shown in FIGS. 1-8. In FIG. 9, shallow cavity 47, a counterpart of the central sphere of the previously discussed connector embodiments (e.g. 1, of FIG. 1) is formed within one of the surfaces (here, 48,) to be joined. Extending from the cavity 47 is a protrusion 49, a counterpart of a combination of the neck and the smaller distal sphere shown previously (e.g. 4 and 5 and 2 and 3, respectively, of FIG. 1). The distal end of protrusion 49 is at least somewhat greater in diameter than the base of the protrusion, in order to assure better retention of the counterpart protrusion to be inserted within it. In practice, each surface (e.g. 48 of FIG. 9) to be joined employing the connector embodied in FIG. 9 has elements 47 and 49 formed as part of surface 48. The connector embodied in FIG. 9, however, is invertible. The protrusion 49 has a cavity 50 (a "dimple") at its distal end. The cavity may be a hole, for easier grasping. When pressed sufficiently firmly by a finger, the protrusion 49 will invert (the inverted position is shown as 51 in FIG. 9), as will the cavity 47 (in inverted position, shown as 52 in FIG. 9). Instead of the protrusion 49, once having been pressed into inverted position, there is now a relatively shallow cavity 52 (the inverted counterpart of cavity 47) containing a smaller but deeper cavity 51, (the inverted counterpart of protrusion 49). Into cavity 51 may be pressed a counterpart of protrusion 49 of FIG. 9. It thus will be seen that the connector embodiment of FIG. 9 serves as both insertable connector element and connector receptacle and that conversion between these phases is accomplished merely by pressure on the connector in its convex, protuberant phase (49 of FIG. 9).

The connector of FIG. 9 is advantageous because the separate insertable connector element (as in FIG. 1 or FIG. 7) has been eliminated. There are therefore no connector elements which are not integral with the surfaces to be joined. Manufacture of such a connector is therefore less complex than a connector with a separate insertable connector element. The manufacturing process for the connector of FIG. 9 combines manufacture of the surfaces to be joined with that of the connector, which is part of the surface. There is no separate insertable connector element. The greater ease of manufacture, and therefore the reduced expense, created by the integral surface/connector configuration is, however, somewhat offset by the need for a relatively hard and firm surface (48, in FIG. 9) which incorporates a relatively flexible but tough area, cavity 47 and protrusion 49. Such a hard/flexible combination of materials is well within the manufacturing state of the art, however, and any additional manufacturing expense required will be at least offset by not having to manufacture a separate insertable connector element, thereby requiring one less die (if, for example, the material is plastic), and less material overall.

Once the concept of an invertible connector of the type shown in FIG. 9 is understood, which is well within the grasp of all but the youngest users, carrying out the inversion and attachment process of the connector of FIG. 9 is relatively simple and requires no particular manual dexterity. Because there are no separate connector elements (all are incorporated within the surfaces to be joined) for at least some users *less* manipulation than for the two-part connectors described herein is required, and there are no small pieces to be mislaid. However, as better described below in reference to FIG. 9A, the range of applications of the connector embodiment of FIG. 9 is limited to circumstances in which a very tight fit of the surfaces to be joined is required.

Figure 9A:
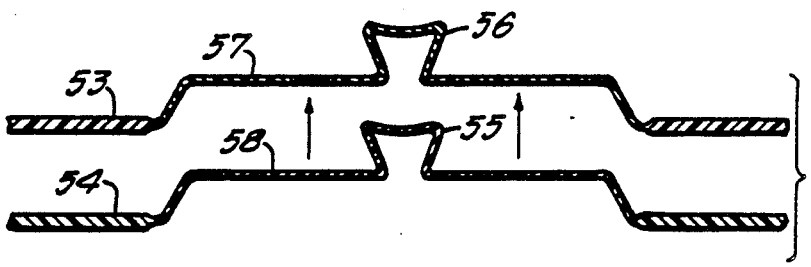
FIG. 9A is a side sectional view showing two of the connector elements of FIG. 9 prior to being joined.

FIG. 9A illustrates one application of the connector shown in FIG. 9. In FIG. 9A are shown two surfaces, 53 and 54, each with a shallow cavity, 57 and 58 respectively, and each with a protuberant element (55 and 56 respectively). Cavities 57 and 58 and protuberant elements 55 and 56 are formed from and as part of surfaces 53 and 54. In practice, protuberances 55 and 56, because they must be somewhat stronger and more flexible than surfaces 53 and 54, are made from a different material than that used for surfaces 53 and 54. Accordingly, although surfaces 53 and 54 will be made of any suitably lightweight but reasonably strong and stiff material, protuberances 55 and 56, as well as the areas of the cavities 57 and 58 immediately adjacent, will suitably be made from a firm but resilient material. There are a number of materials, for example, certain types of plastics, which are suitable for this purpose. The need to join two such different materials during the manufacturing process will of course increase the cost of manufacture of the surface/connector assembly of FIG. 9A, and, consequently, this embodiment likely will be used only in special applications, as discussed below. However, because the surface to be joined and the connector are a single unit, the ease and cost of manufacture, because of the lack of multiple connector pieces, will correspondingly be reduced.

Figure 9B:
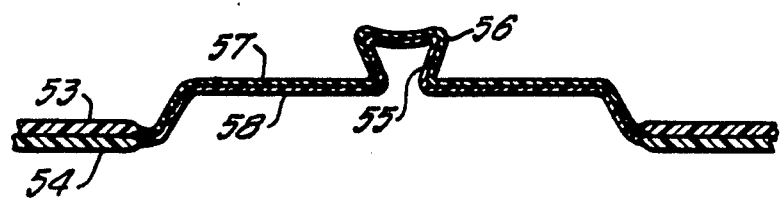
FIG. 9B shows the embodiment of the present invention illustrated in FIG. 9A, in which the connector elements have been joined and attached.

FIG. 9B shows the two surfaces 53 and 54 of FIG. 9A after they have been joined. The result is a very close fit, with little possible lateral or vertical slippage. Because of the close fit of the joined surfaces 53 and 54, disassembly of the two surfaces 53 and 54 may not be easy for young children and this embodiment will undoubtedly be used by older children and adults. The connector embodiment of FIGS. 9A and 9B will also be especially suitable when it is desired to join two surfaces of different dimensions or thickness. Within reasonable limits, and depending upon the flexibility and firmness of the material from which the connector area is made, the permissible thickness of surfaces 53 and 54 is variable, because the connector areas (cavities) 57 and 58, as well as the protuberances 55 and 56, are flexible. Therefore, it will be recognized that as long as the surfaces to be joined and the connector cavities and protuberances in particular are more or less congruent, the thickness, surface area, or dimensions of surfaces 53 and 54, within practical limits, may be variable.

Figure 10:
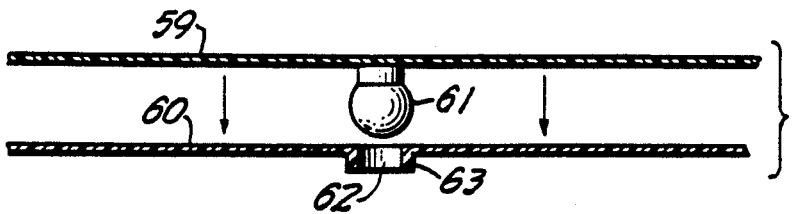
FIG. 10 is a side view, showing the connector and receptacle, of a further embodiment of the present invention.

FIG. 10 illustrates a variant of the connector embodiment shown in FIGS. 9, 9A and 9B. FIG. 10 shows two surfaces, 59 and 60, one of which (59) has a connector/protuberance 61. The other surface 60 has an opening 62, of slightly lesser diameter than protuberance 61, through which the connector/protuberance 61 may be inserted. Opening 62 is surrounded by a strengthened lip 63, the thickness of which, in order to impart additional strength to the connector area, is greater than that of surrounding surface 60. All elements of the connector, including protuberance 61 and lip 63, are integral with surfaces 59 and 60. As is the case with the embodiment shown in FIGS. 9A and 9B, the embodiment shown in FIG. 10, lacking multiple elements, may be inexpensively and easily manufactured. Because the material from which surface 60 and lip 63 is formed is the same (the only difference between the lip 63 and the surface 60 being the greater thickness of the lip 63), and surface 59 and protuberance 61 are made of the same material, there are no different materials to be joined and the surface/connector unit may be easily and cheaply cast or stamped as a unit. As is the case with the embodiment shown in FIGS. 9, 9A and 9B, the embodiment of FIG. 10, because of the tightness of the fit and the relative difficulty of disassembly, will be more advantageously used by older children and adults, and is especially well adapted to the joining of surfaces which are of variable and unequal shape, area, and thickness, and which do not require frequent attachment and disassembly.

While the present invention has been described as above and in connection with the preferred specific embodiments thereof, it will be understood that this description is intended to illustrate and not limit the scope of the invention, which is defined by the following claims.

Accordingly, what we claim is:

1. A device for connecting two walls, which comprises:
   (a) two relatively lightweight, flat, and thin walls, each of said walls including a cavity, both cavities having essentially the same dimensions and each cavity having an opening at its base; and
   (b) a separate connecting element for joining said two walls, said connecting element comprising a central element which is connected to two diametrically opposed necks of essentially equal dimensions, each of said necks being attached to a distal element, each said distal element being of essentially the same dimensions as the other distal element and each distal element being of lesser diameter than said central element and of greater diameter than the neck to which it is attached.

2. The device of claim 1 in which said opening is an unenclosed hole in and through said cavity and said wall.

3. The device of claim 1 in which said opening is a enclosed space extending from said cavity into said wall.

4. The device of claim 1 in which the central element and the distal elements of the connector are spheres.

5. The device of claim 3 in which said enclosed space is shaped to enclose and conform to the shape of said distal element and said neck.

6. The device of claim 1 in which the distal element of the connecting element in cross section is a trapezoid of which:
   (1) the base, attached to the neck, is shorter than the opposite parallel side and;
   (2) the sides enclose at their base equal angles which are greater than 90°; and
   (3) the distal edge is bevelled.

7. The device of claim 1 in which the distal element of the connecting element in cross section is a trapezoid, of which:
   (1) the base, attached to the neck, is shorter than the opposite parallel side;
   (2) the sides enclose at their base equal angles which are greater than 90°;
   (3) the length of each side is approximately equal to the thickness of the wall containing the cavity; and
   (4) the distal end is bevelled.

8. The device of claim 1, in which the diameter of each neck of the connecting element is approximately one half the diameter of the distal element to which it is attached and the length of the neck is approximately equal to the thickness of the wall containing the cavity.

9. The device of claim 1, in which the diameter of each neck of the connecting element is slightly less than the diameter of the distal element to which it is attached and the length of the neck is approximately equal to the thickness of the wall containing the cavity.

10. A device for connecting two relatively thin and flat walls, wherein each of said walls contains a shallow recessed space, both of said spaces being of approximately equal dimensions, each said space possessing a protruding nipple, both said nipples being of approximately equal dimensions, and each said space and nipple being capable of being inverted by the application of pressure to the nipple to form a corresponding, mirror-image, space and nipple.

11. A method for connecting two relatively thin and flat walls, each of said walls containing at least one cavity with a basal opening, said cavities being of approximately equal dimensions and said openings being of approximately equal dimensions, the method comprising;
   (1) inserting into a first cavity in one of the walls a separate connecting element, said connecting element comprising a central element which is attached at diametrically opposed positions respectively to a neck, each of which said necks is attached to a distal element, each said distal element having a diameter greater than that of the corresponding neck, and both of said necks being of approximately equal dimensions and both of said distal elements being of approximately equal dimensions;
   (2) forcing one distal element of the connecting element into the basal opening of said first cavity; and
   (3) inserting said connecting element into a second cavity in the other wall and forcing the second distal element of the connecting element into the basal opening of said second cavity.

12. A method for connecting two relatively thin and flat walls, each of said walls possessing at least one relatively shallow depressed area, both said areas being of approximately equivalent dimensions, and each of which areas surrounds a protruding nipple, both nipples being of approximately equal dimensions, the distal end of said nipple being greater in diameter than the remainder of the nipple, said depressed areas and said nipples being capable of inversion following the application of pressure to the nipple, the method comprising:
   (1) aligning the depressed area and nipple on one wall with the depressed area and nipple on a second wall; and
   (2) by the application of pressure, forcing the depressed area and the nipple on one wall into the corresponding depressed area and nipple on the second wall.

* * * * *